United States Patent [19]

Nomura et al.

[11] Patent Number: 4,485,187

[45] Date of Patent: Nov. 27, 1984

[54] PROCESS FOR PRODUCING ETHYLENE POLYMERS

[75] Inventors: Takeshi Nomura; Kouji Maruyama; Hiroshi Ueno; Naomi Inaba; Makota Yoda, all of Saitama, Japan

[73] Assignee: Toa Nenryo Kogyo Kabushiki Kaisha, Tokyo, Japan

[21] Appl. No.: 418,499

[22] Filed: Sep. 15, 1982

[30] Foreign Application Priority Data

Sep. 29, 1981 [JP] Japan ................. 56-152992

[51] Int. Cl.$^3$ ............................... C08F 4/64
[52] U.S. Cl. ............................. 502/134; 502/105; 502/128; 526/125
[58] Field of Search ............... 252/429 B, 429 C; 502/105, 134

[56] References Cited

U.S. PATENT DOCUMENTS 3,412,174 11/1968 Kroll .................... 252/429 B X
3,644,318 2/1972 Diedrich et al. ............. 260/88.2
4,240,929 12/1980 Dietz et al. ............. 252/429 C X
4,362,648 12/1982 Dietz et al. ............. 252/429 C X

FOREIGN PATENT DOCUMENTS 55-151011 11/1980 Japan.

Primary Examiner—Patrick Garvin
Attorney, Agent, or Firm—M. B. Kurtzman

[57] ABSTRACT

A catalyst for polymerizing ethylene and α-olefins and process for producing ethylene polymers which comprises homopolymerizing ethylene or copolymerizing ethylene and other olefins in the presence of a catalyst comprising a catalyst component and an organoaluminum compound, said catalyst component being obtained by mechanically copulverizing (A) a magnesium halide and (B) magnesium hydrocarbyloxide at a molar ratio of B/A=0.5 to 1.5 and subsequently bringing the resulting pulverized product into contact with a tetravalent titanium halide in the presence of a hydrocarbon and/or halogenated hydrocarbon.

4 Claims, No Drawings

PROCESS FOR PRODUCING ETHYLENE POLYMERS

FIELD OF THE INVENTION

This invention relates to catalyst components for use in the polymerization of ethylene and α-olefins and a process for producing ethylene polymers. More particularly, the invention relates to a process for producing high bulk density ethylene homopolymers or copolymers at high yields.

DESCRIPTION OF THE PRIOR ART

In order to obtain highly active catalysts for ethylene polymerization several methods have been employed to bring a treated magnesium compound into contact with a titanium compound.

For instance, according to U.S. Pat. No. 3,644,318, a magnesium alcoholate is reacted with an inorganic solid substance such as $MgF_2$ and $MgCl_2$ before the titanium compound is reacted with magnesium alcoholate in the process for polymerizing an olefin with a catalyst component obtained by reacting magnesium alcoholate and a tetravalent titanium compound. According to comparative Example 8 of Japanese Patent Laid-Open No. 151011/1980, magnesium chloride anhydride and magnesium ethoxide are copulverized and then the pulverized product is brought into contact with titanium tetrachloride.

Polymerization with a catalyst component obtained by these processes has the following disadvantages. (1) the catalytic activity is not sufficient, (2) the resulting polymer is low in bulk density and the productivity of the polymerization unit cannot be increased, (3) the catalytic activity decreases considerably during polymerization over a long time, (4) the effect of molecular weight adjustment is little when hydrogen is used as a molecular weight modifier, therefore high hydrogen partial pressure or high polymerization temperature is required to increase the melt index of the resulting polymer, and (5) the reactivity with an olefin as a comonomer in copolymerization is low and high comonomer concentration is required.

SUMMARY OF THE INVENTION

In accordance with this invention, it has been discovered that the above disadvantages are reduced by using magnesium alkoxide and magnesium halide in specific ranges during the preparation of a catalyst component. More particularly, the present invention resides in a catalyst component, a catalyst comprising the catalyst component and an organoaluminum compound, and a process for producing ethylene polymers which comprises homopolymerizing ethylene or copolymerizing ethylene and other olefin in the presence of the catalyst, said catalyst component being obtained by mechanically copulverizing (A) a magnesium halide and (B) magnesium hydrocarbyloxide at a molar ratio of $B/A = 0.5$ to 1.5 and subsequently bringing the resulting pulverized product into contact with a tetravalent titanium halide in the presence of a hydrocarbn and/or halogenated hydrocarbon. In co-pending application Ser. No. 418,500 filed concurrently herewith a catalyst component is disclosed comprising the product obtained by contacting a magnesium hydrocarbyloxide, a halogenated hydrocarbon and a titanium compound.

The magnesium hydrocarbyloxide employed in this invention is represented by the formula $Mg(OR)(OR')$, wherein R and R' are alkyl, alkenyl, cycloalkyl, aryl, and aralkyl groups having 1 to 20 preferably 1 to 10 carbon atoms, and R and R' may be the same or different.

Examples of such compounds are $Mg(OCH_3)_2$, $Mg(OC_2H_5)_2$, $Mg(OCH_3)(OC_2H_5)$, $Mg(Oi—C_3H_7)_2$, $Mg(OC_3H_7)_2$, $Mg(OC_4H_9)_2$, $Mg(Oi—C_4H_9)_2$, $Mg(OC_4H_9)(Oi—C_4H_9)$, $Mg(OC_4H_9)(Osec—C_4H_9)$, $Mg(OC_6H_{13})_2$, $Mg(OC_8H_{17})_2$, $Mg(OC_6H_{11})_2$, $Mg(OC_6H_5)_2$, $Mg(OC_6H_4CH_3)_2$, and $Mg(OCH_2C_6H_5)_2$.

These magnesium compounds should be dried, preferably heat-dried in vacuo, before use. It is especially preferable to use a magnesium hydrocarbyloxide which has been pulverized after drying.

The magnesium halide includes magnesium chloride, magnesium bromide, and magnesium iodide. Preferable among them is magnesium chloride.

It is advantageous to use a powdery magnesium halide having an average particle diameter from 1 to 50 microns; but greater particle diameters are permissible.

Anhydrous magnesium halide containing substantially no crystal water is preferable. Therefore, a commercial product should preferably be heat-treated at 200° to 600° C. in an inert gas or at 100° to 400° C. in vacuo.

The titanium halide used in this invention is a tetravalent titanium halide. Examples of such titanium halides include titanium tetrachloride, titanium tetrabromide and titanium tetraiodide. Preferable among them is titanium tetrachloride.

The hydrocarbon used in this invention includes saturated aliphatic hydrocarbons such as pentane, hexane, heptane, octane, and decane; saturated alicyclic hydrocarbons such as cyclopentane, cyclohexane, and methylcyclohexane; and aromatic hydrocarbons such as benzene, toluene, xylene, and ethylbenzene. Other hydrocarbons may be usefully employed.

The halogenated hydrocarbon used in this invention is a mono- or polyhalogen substituted compound of a saturated or unsaturated aliphatic, alicyclic, or aromatic hydrocarbon having 1 to 12 carbon atoms. Examples of such compounds include halogenated aliphatic compounds such as methyl chloride, methyl bromide, methyl iodide, methylene chloride, methylene bromide, methylene iodide, chloroform, bromoform, iodoform, carbon tetrachloride, carbon tetrabromide, carbon tetraiodide, ethyl chloride, ethyl bromide, ethyl iodide, 1,2-dichloroethane, 1,2-dibromoethane, 1,2-diiodoethane, methylchloroform, methylbromoform, methyliodoform, form, 1,1,2-trichloroethylene, 1,1,2-tribromoethylene, 1,1,2,2-tetrachloroethylene, pentachloroethane, hexachloroethane, hexabromoethane, n-propylchloride, 1,2-dichloropropane, hexachloropropylene, octachloropropane, decabromobutane, and chlorinated paraffin; alicyclic compounds such as chloroyclopropane, tetrachlorocyclopentane, hexachloropentadiene, and hexachlorocyclohexane; and aromatic compounds such as chlorobenzene, bromobenzene, o-dichlorobenzene, p-dichlorobenzene, hexachlorobenzene, hexabromobenzene, benzotrichloride, and p-chlorobenzotrichloride. These compounds may be used individually or in combination.

DETAILED DESCRIPTION OF THE INVENTION

Process for Preparing the Catalyst Component

The catalyst component of this invention is obtained by mechanically copulverizing a magnesium halide and a magnesium hydrocarbyloxide and then bringing the pulverized product into contact with a titanium halide in the presence of a hydrocarbon and/or a halogenated hydrocarbon.

Contact of the magnesium halide and the magnesium hydrocarbyloxide accomplished by mechanically pulverizing. Pulverization may be accomplished by using a commonly used crusher such as rotary ball mill, vibration ball mill, and impact mill. Copulverization may be performed, as required, in vacuo or in an atmosphere of inert gas in the substantial absence of moisture and oxygen.

Contact by copulverization is usually performed at 0° to 200° C. for 0.5 to 100 hours, preferably at 20° to 150° C. for 2 to 50 hours.

The ratio of magnesium halide and a magnesium hydrocarbyloxide brought into contact with each other is 1 mol of the former and 0.5 to 1.5 mol, preferably 0.8 to 1.2 mol, more preferably 1 mol, for the latter.

The solid in the form of fine powder (referred to as solid component hereinafter) obtained in the above step is then brought into contact with a titanium halide.

Contact of the solid component and titanium halide is accomplished in the presence of a hydrocarbon and/or a halogenated hydrocarbon.

Contact may be accomplished by stirring a slurry in which the solid component together with a titanium halide are suspended in hydrocarbon and/or halogenated hydrocarbon.

The solid component and titanium halide are brought into contact with each other at a ratio of 0.1 gram mol and more, preferably 1 to 5 gram mol of titanium halide for 1 gram-atom of magnesium in the solid component. The hydrocarbon and/or halogenated hydrocarbon is used in such an amount that the solid component is about 10 to about 300 g in 1 liter of the liquid substance (hydrocarbon and/or halogenated hydrocarbon, and liquid titanium halide).

Contact of the solid component and a titanium halide may be accomplished at 0° to 200° C. for 0.5 to 20 hours, preferably at 60° to 150° C. for 1 to 5 hours.

The solid substance obtained is then separated from the liquid substance and, if required, washed with an inert solvent such as hexane, heptane, octane, cyclohexane, benzene, toluene, and xylene, followed by drying, to yield the catalyst component.

The catalyst component obtained in the above step is combined with an organoaluminum compound to give a catalyst to be used in this invention.

The organoaluminum compound to be used with the catalyst component for polymerization of ethylene is represented by the formula $R_nAlX_{3-n}$ wherein R is an alkyl or aryl group; X is a halogen atom, alkoxyl group, or hydrogen atom; and n is an arbitrary number in the range of $1 \leq n \leq 3$. Examples of such compounds include alkyl aluminum compounds and mixtures or complex compounds thereof having 1 to 18 carbon atoms, preferably 2 to 6 carbon atoms, such as trialkyl aluminum, dialkyl aluminum monohalide, monoalkyl aluminum dihalide, alkyl aluminum sesquihalide, dialkyl aluminum monoalkoxide, and dialkyl aluminum monohalide. Specific examples include trialkyl aluminum such as trimethyl aluminum, triethyl aluminum, tripropyl aluminum, triisobutyl aluminum, and trihexylaluminum; dialkyl aluminum monohalide such as dimethyl aluminum chloride, diethyl aluminum chloride, diethyl aluminum bromide, diethyl aluminum iodide, and diisobutylaluminum chloride; monoalkyl aluminum dihalide such as methyl aluminum dichloride, ethyl aluminum dichloride, ethyl aluminum dibromide, ethyl aluminum diiodide, and isobutyl aluminum dichloride; alkyl aluminum sesquihalide such as ethyl aluminum sesquichloride; dialkyl aluminum monoalkoxide such as dimethyl aluminum methoxide, diethyl aluminum ethoxide, diethyl aluminum phenoxide, dipropyl aluminum ethoxide, diisobutyl aluminum ethoxide, and diisobutyl aluminum phenoxide; and dialkyl aluminum hydride such as dimethyl aluminum hydride, diethyl aluminum hydride, dipropyl aluminum hydride, and diisobutyl aluminum hydride.

Preferable among them is trialkyl aluminum, particularly triethyl aluminum and triisobutyl aluminum. These trialkyl aluminum compounds may be used in combination with other organoaluminum compounds such as diethyl aluminum chloride, ethyl aluminum dichloride, ethyl aluminum sesquichloride, diethyl aluminum ethoxide, diethyl aluminum hydride, or a combination or complex compound thereof, which are readily available in commercial quantities.

The organoaluminum compound may be used alone; however, it may also be used in combination with an electron donor compound. Examples of electron donor compounds include carboxylic acids; carboxylic esters, alcohols; ethers; ketones; amines; amides; nitriles; aldehydes; alcoholates; phosphorus, arsenic, or antimony compounds connected to an organic group through a carbon or oxygen atom; phosphoamides; thioethers; thioesters; and carbonic esters. Preferable among them are carboxylic esters, alcohols, and ethers.

Examples of carboxylic esters include butyl formate, ethyl acetate, butyl acetate, ethyl acrylate, ethyl butyrate, isobutyl isobutyrate, methyl methacrylate, diethyl maleate, diethyl tartrate, ethyl cyclohexanecarboxylate, ethyl benzoate, ethyl p-methoxybenzoate, ethyl p-t-butylbenzoate, dibutyl phthalate, diallyl phthalate, and ethyl α-naphthoate. Preferable among them are alkyl esters of aromatic carboxylic acids, particularly, 1- to 8-carbon alkyl esters of nuclear-substituted benzoic acid such as p-methyl benzoate and p-methoxy benzoate.

The alcohols are represented by the formular ROH, where R is an alkyl, alkenyl, cycloalkyl, aryl, and aralkyl group having 1 to 12 carbon atoms. Examples of such alcohols include methanol, ethanol, propanol, isopropanol, butanol, isobutanol, pentanol, hexanol, octanol, 2-ethylhexanol, cyclohexanol, benzyl alcohol, and allyl alcohol.

The ethers are represented by the formula ROR', where R and R' are alkyl, alkenyl, cycloalkyl, aryl, and aralkyl group having 1 to 12 carbon atoms, and R and R' may be the same or different. Examples of such ethers include diethyl ether, diisopropyl ether, dibutyl ether, diisobutyl ether, diisoamyl ether, di-2-ethylhexyl ether, diallyl ether, ethyl allyl ether, butyl allyl ether, diphenyl ether, anisole, and ethyl phenyl ether.

These electron donor compounds may be used when an organoaluminum compound is used in combination with the catalyst component, or may be used after previous contact with an organoaluminum compound.

The organoaluminum compound is used in an amount of 1 to 2000 gram mol, preferably 20 to 500 gram mol per 1 gram-atom of titanium in the catalyst component of this invention.

The organoaluminum compound and the electron donor compound are used in a ratio of 0.1 to 40 gram-atom, preferably 1 to 25 gram-atom of the former to 1 mol of the latter.

The catalyst prepared in accordance with this invention is used for homopolymerization of ethylene or for copolymerization of ethylene and other olefin to produce ethylene homopolymers or copolymers. The olefins to be copolymerized with ethylene include α-olefins having 3 to 10 carbon atoms such as propylene, 1-butene, 4-methyl-1-pentene, 1-hexene, and 1-octene. Copolymerization of ethylene with such α-olefins may be accomplished in either random copolymerization or block copolymerization.

The polymerization reaction may be accomplished in either gas phase or liquid phase. The liquid phase polymerization may be performed in an inert hydrocarbon such as n-butane, isobutane, n-pentane, isopentane, hexane, heptane, octane, cyclohexane, benzene, toluene, and xylene, or in the liquid monomer. The polymerization temperature is usually in the range from −80° C. to +150° C., preferably from 40° C. to 120° C. The polymerization pressure is 1 to 60 atmosphere. The molecular weight of the resulting polymer be adjusted by hydrogen or other known molecular weight modifier. The quantity of the olefin to be copolymerized is usually in the range up to 30 wt %, particularly from 0.3 to 15 wt %. The polymerization reaction using the catalyst system of this invention may be performed continuously or batchwise under conventional conditions. The copolymerization may be accomplished in one stage or in two or more stages.

According to the process of this invention it is possible to produce ethylene homopolymers or ethylene-α-olefin copolymers having a high bulk density at high yields. In addition, molecular weight control with hydrogen is easy to perform. The catalyst system containing the catalyst component of this invention maintains a high catalytic activity even under a high hydrogen partial pressure.

EXAMPLES

The invention is described in detail with reference to the following non-limitative examples. Percent (%) used in the examples is wt %, unless otherwise specified.

The melt index (MI) of the resulting polymer was determined at 190° C. under a load of 2.16 kg according to ASTM D1238. The flow ratio (FR) is a quotient obtained by dividing the value (HLMI) measured at 190° C. under 21.6 kg by the value (MI) measured at 190° C. under 2.16 kg. It represents the ratio of the discharged quantities of a polymer, and it is also a measure expressing the molecular weight distribution of the resulting polymer. The cyclohexane solubles (CHS) which indicates the ratio of low molecular weight fractions in the resulting polymer was determined by extracting the polymer with boiling cyclohexane for 5 hours in a Soxhlet extractor of improved type.

The catalytic activity Kc is expressed by the quantity (g) of polymer formed by 1 g of the catalyst. The specific catalyst activity indicates the quantity (g) of polymer formed per 1 g of the catalyst for 1 hour of polymerization under a monomer partial pressure 1 kg/cm$^2$.

The bulk density was determined according to ASTM D1895-69, Method A.

EXAMPLE 1

Preparation of Catalyst Component 9.8 g of commercial magnesium diethoxide [Mg(OEt)$_2$] and 8.4 g of substantially anhydrous magnesium chloride (MgCl$_2$) were placed in a 1-liter stainless steel (SUS 32) mill pot containing 340 stainless steel (SUS 32) balls 12 mm in diameter in a nitrogen atmosphere. The mill pot was shaken on a shaker for 15 hours to give the crushed product (S-1).

4.5 g of the crushed product (S-1) was placed in a 300-ml flask in a nitrogen gas atmosphere. To this flask were added 100 ml of toluene and 50 ml of titanium tetrachloride. Contact of the reactants was accomplished by stirring at 100° C. for 2 hours.

The solid substance was filtered out and washed six times, each time with 100 ml of n-hexane at 65° C., and subsequently dried at 65° C. in vacuo for 1 hour to give 4.3 g of the catalyst component containing 6.1% of titanium.

Polymerization of Ethylene

Into a 1.5-liter stainless steel (SUS 32) autoclave equipped with a stirrer were charged in a nitrogen atmosphere 11.8 mg of the catalyst component obtained in the above step, 0.7 mmol of triisobutyl aluminum, and 700 ml of isobutane. The polymerization system was heated to 85° C. Hydrogen was introduced into the autoclave to the extent that the partial pressure of hydrogen reached 2 kg/cm$^2$. Ethylene was introduced to the extent that the ethylene partial pressure reached 5.0 kg/cm$^2$. Ethylene was supplied continuously to carry out polymerization for 60 minutes while keeping constant the total pressure of the polymerization system. After completion of polymerization, the solvent and unreacted ethylene were purged and white powdery polymer was collected. The polymer was dried at 70° C. for 10 hours in vacuo. Thus, 273 g of polyethylene powder having an MI of 1.71, an FR of 35.2, and a bulk density of 0.35 g/cc was obtained. The catalytic activity Kc was 23,100 and the specific catalytic activity was 4,620. The CHS of the polymer was 0.320%.

EXAMPLES 2 TO 5

Preparation of Catalyst Components

Four kinds of catalyst components containing titanium as shown below were prepared in the same manner as in Example 1 except that the ratios of the magnesium diethoxide and magnesium chloride were varied as shown below.

| Example | (molar ratio) Mg(OEt)$_2$/MgCl$_2$ | | Titanium Content (%) |
|---|---|---|---|
| 2 | 1.5 | 1.0 | 8.5 |
| 3 | 0.5 | 1.0 | 6.1 |
| 4 | 1.0 | 0.8 | 7.2 |
| 5 | 0.8 | 1.0 | 5.3 |

Polymerization of Ethylene

Ethylene was polymerized as in Example 1 except that the catalyst component in Example 1 was replaced by the four catalyst components obtained in the above step. The results are shown in Table 1.

EXAMPLES 6 TO 8

Preparation of Catalyst Components

Three kinds of catalyst components containing titanium as shown below were prepared in the same manner as in Example 1 except that the toluene used in combination with titanium tetrachloride for treatment of the crushed product (S-1) was replaced by the diluents as shown below.

| Example | Diluent | Titanium Content (%) |
| --- | --- | --- |
| 6 | n-Heptane | 5.8 |
| 7 | 1,2-Dichloropropane | 6.1 |
| 8 | Toluene/1,2-dichloropropane (50/50 vol %) | 6.9 |

Polymerization of Ethylene

Ethylene was polymerized as in Example 1 except that the catalyst component in Example 1 was replaced by the three catalyst components obtained in the above step. The results are shown in Table 1.

COMPARATIVE EXAMPLES 1 AND 2

Preparation of Catalyst Components

Two kinds of catalyst components containing titanium as shown below were prepared in the same manner as in Example 1 except that the ratios of magnesium ethoxide and magnesium chloride were varied as shown below.

| Comparative Example | Mg(OEt)$_2$/MgCl$_2$ (molar ratios) | | Titanium content (%) |
| --- | --- | --- | --- |
| 1 | 1.0 | 0.3 | 9.1 |
| 2 | 0.3 | 1.0 | 3.3 |

Polymerization of Ethylene

Ethylene was polymerized as in Example 1 except that the catalyst component in Example 1 was replaced by the two catalyst components obtained in the above step. The results are shown in Table 1.

It is apparent from Table 1 that when the molar ratio of magnesium chloride is low, the catalytic activity is extremely low, and when the molar ratio of magnesium diethoxide is low, the catalytic activity is low and the effect of hydrogen as molecular weight modifier is little.

TABLE 1

| Example | Kc | Catalytic Activity Specific Activity | MI | FR | Bulk Density | CHS |
| --- | --- | --- | --- | --- | --- | --- |
| 1 | 23,100 | 4,620 | 1.71 | 35.2 | 0.35 | 0.32 |
| 2 | 24,100 | 4,820 | 1.10 | 33.5 | 0.35 | 0.29 |
| 3 | 20,500 | 4,100 | 1.68 | 34.1 | 0.36 | 0.26 |
| 4 | 23,900 | 4,780 | 1.23 | 31.8 | 0.34 | 0.27 |
| 5 | 22,300 | 4,460 | 1.35 | 35.1 | 0.35 | 0.28 |
| 6 | 23,500 | 4,700 | 1.45 | 33.9 | 0.35 | 0.27 |
| 7 | 24,500 | 4,900 | 1.31 | 37.1 | 0.33 | 0.26 |
| 8 | 24,900 | 4,980 | 1.45 | 35.3 | 0.36 | 0.28 |
| Comp. 1 | 11,500 | 2,300 | 0.535 | 31.3 | 0.31 | 0.29 |
| Comp. 2 | 12,500 | 2,500 | 0.960 | 32.9 | 0.34 | 0.295 |

EXAMPLE 9

Copolymerization of Ethylene and 1-Butene

Into the same autoclave as used in Example 1 were charged in a nitrogen atomosphere 11.9 mg. of the catalyst obtained in Example 1, 0.7 mmol of triisobutyl aluminum, and 700 ml of isobutane. The polymerization system was heated to 85° C. Hydrogen was introduced into the autoclave to the extent that the partial pressure of hydrogen reached 0.08 kg/cm$^2$. Ethylene was introduced into the autoclave to the extent that the partial pressure of ethylene reached 3 kg/cm$^2$, and then 5 g of 1-butene was added. Ethylene was supplied continuously to carry out polymerization for 60 minutes while keeping constant the total pressure of the polymerization system. After completion of polymerization, the same treatments as in Example 1 were carried out. Thus, 351.3 g of powdery ethylene-1-butene copolymer was obtained. The specific catalytic activity was 9,840. The copolymer was found to have a bulk density of 0.35 g/cc, a true density of 0.926 g/cc, and an MI of 0.0021.

EXAMPLE 10

Polymerization of Ethylene

Ethylene was polymerized as in Example 1 except that the catalyst component obtained in Example 1 was used in an amount of 12.5 mg and the partial pressure of hydrogen was kept at 10 kg/cm$^2$. Polyethylene powder was obtained in an amount of 285.0 g, which was found to have an MI of 560, a bulk density of 0.35 g/cc, and a true density of 0.972 g/cc. The specific catalytic activity was 4,560. The polymerization catalyst exhibited a high activity in spite of high hydrogen partial pressure. The CHS was as low as 5.1% in spite of the high MI of the resulting polymer, and the powder of the polymer was fluid.

What is claimed is:

1. A catalyst component for the polymerization of ethylene and copolymerization of ethylene with an α-olefin having from 3 to 10 carbon atoms comprising titanium tetrahalide contacted with a solid component comprising copulverized (A) magnesium halide and (B) a magnesium compound represented by the formula Mg(OR)(OR') wherein R and R' are an alkyl, alkenyl, cycloalkyl, aryl and aralkyl groups having from 1 to 20 carbon atoms, R and R' being the same or different, the molar ratio of B/A being 0.5 to 1.5, the ratio of solid component and titanium tetrahalide being in the range of 1:1-5 on a gram mol basis.

2. A catalyst component of claim 1 wherein the titanium tetrahalide is titanium tetrachloride, the magnesium compound is magnesium diethoxide and the magnesium halide is magnesium chloride.

3. A catalyst for the polymerization of ethylene and copolymerization of ethylene with an α-olefin having from 3 to 10 carbon atoms, said catalyst comprising the catalyst component of claim 1 and an organoaluminum compound represented by the formula $R''_nAlX_{3-n}$ wherein R" is an alkyl or aryl group, X is a halogen atom, alkoxyl group or hydrogen atom, and n is a number in the range of $1 \leq n \leq 3$.

4. A catalyst for the polymerization of ethylene and copolymerization of ethylene with an α-olefin having from 3 to 10 carbon atoms, said catalyst comprising the catalyst component of claim 2 and an organoaluminum compound represented by the formula $R''_nAlX_{3-n}$ wherein R" is an alkyl or aryl group, X is a halogen atom, alkoxyl group or hydrogen atom, and n is a number in the range of $1 \leq n \leq 3$.

* * * * *